(12) United States Patent
Franzke

(10) Patent No.: US 6,783,202 B2
(45) Date of Patent: Aug. 31, 2004

(54) INK JET IMAGE PRODUCING DEVICE AND PROCESS FOR ITS OPERATION

(75) Inventor: Dieter Franzke, Windisch (CH)

(73) Assignee: Gretag Imaging Trading AG, Wettingen (CH)

( * ) Notice: Subject to any disclaimer, the term of this patent is extended or adjusted under 35 U.S.C. 154(b) by 0 days.

(21) Appl. No.: 10/139,895

(22) Filed: May 7, 2002

(65) Prior Publication Data

US 2002/0171710 A1 Nov. 21, 2002

(30) Foreign Application Priority Data

May 8, 2001 (EP) .............................................. 01111113

(51) Int. Cl.⁷ .............................. B41J 2/205; B41J 2/21
(52) U.S. Cl. .......................................... 347/15; 347/43
(58) Field of Search ...................... 347/15, 43; 358/1.9, 358/3.1

(56) References Cited

U.S. PATENT DOCUMENTS 6,341,833 B1 * 1/2002 Liu et al. ....................... 347/15

FOREIGN PATENT DOCUMENTS

| EP | 0 354 490 | 2/1990 |
| EP | 0 763 926 | 3/1997 |
| EP | 0 961 487 | 12/1999 |
| EP | 0 982 932 | 3/2000 |

\* cited by examiner

*Primary Examiner*—Thinh Nguyen
(74) *Attorney, Agent, or Firm*—Peter F. Corless; Steven M. Jensen; Edwards & Angell, LLP

(57) ABSTRACT

An ink jet image producing device for reproducing digital image data of photographic images is disclosed with at least one printing head (32) which has more than three base colors or ink jet colors available which stretch a color space. A processing device determines the location or color coordinates of color values of the image data in the image space which is stretched by the colors of the printing head. A determining device determines with which base or ink jet printing colors or mixtures or with which densities thereof the color values of the image data can be reproduced. A threshold device (20) is provided which has at least one threshold for a degree of coverage or the like of at least one printing medium. An analysis device analyzes whether a determined color set requires a large or small amount of ink so that the threshold device can select for the printing medium one of the color sets in dependence of the threshold for the printing medium while a printing head control device is used for printing the image data by way of the printing head and with the selected color set.

13 Claims, 3 Drawing Sheets

INK JET IMAGE PRODUCING DEVICE AND PROCESS FOR ITS OPERATION

FIELD OF THE INVENTION

The invention relates to an ink jet image producing device for the reproduction of digital image data of photographic images and to a process for the control of an ink jet image producing device.

BACKGROUND ART

Conventional ink jet printers generally use three base colors to produce color reproductions of images. Cyan, Magenta and Yellow are generally used as the base colors. An even larger color pallet can be achieved when black is added as a further printing ink. In order to achieve a better color resolution, special ink jet printers also use 6 or even 8 colors, for example in the professional production of billboards or the like. The use of a certain paper is also important, since the color impression to the observer is also strongly dependent on how a printing medium absorbs ink, or how the ink flows on the surface of the printing medium and thereby mixes or bleeds.

On the other hand, it is possible to produce a desired color which is to be produced by way of an ink jet printer by different mixtures of the base colors present in the ink jet printer. Diverse colors can thereby already be produced by different mixtures of only three base colors. With more than three printer colors, such as 6 or 8 printer colors, the color reproduction possibilities are again multiplied. Many different color sets can thereby be computed for the reproduction of one and the same color. However, although those colors are the same according to color measurement technology, they can generate a different color impression to the human eye. This is additionally also determined by the surface quality, the absorption behavior and other quality parameters of the printing medium, such as a photographic paper or the like.

SUMMARY OF THE INVENTION

It is therefore an object of the present invention to overcome as much as possible the disadvantages of the prior art.

It is especially an object to provide an ink jet image producing device which provides an optimal color impression to the observer.

It is further a preferred object to reproduce the desired colors with a minimized amount of ink material.

It is a further object according to the invention to optimally reproduce so called memory colors which are also referred to as "memory colors".

In a preferred embodiment, an ink jet image producing device with the features according to the invention includes a printing head with more than three base colors or more than three ink jet print colors which stretch a color space. A processing device is provided for calculating the location or color coordinates of color values of the image data in the color space. Furthermore, a determination device is provided to determine with which base or ink jet print colors or mixtures, and especially which color densities thereof, altogether referred to as—color set—, the color data of the image data can be reproduced, whereby in general several possible color sets are determined. Furthermore, a threshold device is provided which includes at least one threshold for a degree of coverage of at least one printing medium, whereby an evaluation device is provided which evaluates whether a determined color set requires a larger ink amount or a smaller ink amount, for reproduction especially on a specific, preselected printing medium. The threshold device thereby selects one of the color sets depending on the threshold for the printing medium used and the image data are printed by way of the printing head with the selected color set by using a printing head control device.

In another preferred embodiment in accordance with the invention the device includes an arrangement with at least three printing heads with respectively at least one base color instead of at least one printing head with more than three base colors. The at least three printing heads are then controlled corresponding to the otherwise at least one printing head with more than three base or print colors.

The invention also provides a process in the form of software, for example, on computer readable data carriers or in the form of a computer readable electromagnetic wave constellation.

It is possible in accordance with the preferred process of the invention to select a specific color set from many possible color sets depending on the properties of a respectively used printing medium and depending on the desired color as well as the corresponding color density. For example, when a less strong color is to be applied, a color set can be selected for the production of this color which leads to the printing of as large as possible a surface of the printing medium.

Furthermore, when a strong color is applied which itself has a high color density, it is possible to print it out with the use of a small amount of ink, if the absorption capacity of the printing medium is also limited.

This approach has also the advantageous aspect that on the one hand somewhat higher color densities can be produced, while on the other hand the amount of ink applied can be used more effectively. Moreover, the printing speed can be increased, since because of the smaller amount of ink used a faster drying of the ink on the printing medium is achieved, thereby allowing for the application of a larger amount of information within the same time frame, which can contribute to the reproduction of a larger image surface per unit time.

The present invention can play a very special role when a large number of base or printer colors are used, so that the number of available color sets is further increased. More than one threshold value can also possibly be used for a specific printing medium in order to optimally consider the behavior of the printing medium relative to the different color sets with different amounts of applied ink.

A preferred ink jet image producing device in accordance with the invention which can be used especially advantageously further includes an image data analysis device for determining whether the image data include key memory colors, so called "memory colors". If that is the case, a memory color assignment device which assigns the determined color image data which fit the memory color to that color set or ink of a color set which comes closest to the memory color. During the printing out of the image data, the printing head control device preferably controls the at least one printing head using the assignment result of the memory color assignment unit.

An especially good reproduction result can be achieved in this matter for colors which are especially engrained in the human memory, such as human skin color, sky blue, street gray, or the like, in that a color set or directly a corresponding ink is used for the printout of these colors which directly corresponds to the memory colors or come especially close thereto. The above mentioned threshold value can here also be used, when, for example, several color sets are possible for the reproduction of the corresponding memory color.

In order to identify the memory colors, a color analysis of the image data of an image is preferably carried out by which, based on probabilities, it is determined which color in an image corresponds with high probability to a memory color. On the other hand, it is also possible to carry out a pattern detection to identify memory colors. One can thereby, for example, search for a facial pattern in an image in order to determine with high probability, if not even with certainty, for subsequent processing in accordance with the invention, whether human skin as carrier of a memory color is present in an image.

According to a further aspect of the present invention, an ink jet image generating device is provided, the advantages of which are based on that memory colors are determined from an image data set and then a color set is selected for the printout of these memory colors especially truly reproduces the color. A threshold value (or several threshold values) is preferably also used dependent on the printing medium used, for again selecting, if several equally suitable color sets are possible, a color set which provides for an optimized color reproduction using the lowest possible amount of ink, and thereby allowing a higher printing speed or faster drying, or when the color to be reproduced has a low color density, preferably using a color set which requires a large amount of ink.

A transformation device is preferably provided with respect to both aspects of the present invention, which transforms the image data using the selected color set or the selected ink into printing head control data which are supplied to the printing head control device.

In order to further achieve an improved reproduction of the colors, several printing heads are preferably provided which are respectively controlled using their respective base colors in order to provide an optimized color reproduction.

A relatively simple model of a printing head with only three print colors is thereby preferably used, for example, when only those color image data are output which can be optimally printed with the print colors present in this printing head. A further color set is then preferably made available through an immediately downstream further printing head which also only has three print colors available, but which are different from the first three colors and which again can be printed optimally or optimized by this further printing head. Therefore, a multitude of different color sets can be provided with comparatively primitive printing heads arranged directly in series of one another with respectively different colors, and at the same time these respective printing heads preferably include colors which are closely adjacent to memory colors or identical thereto.

Conversely, a printing head with many colors can be used, whereby color sets can be combined from the diverse colors or base colors in order to stretch several color spaces. A printing head with, for example, ten colors can provide about 3 or 4 combinations of respectively n colors (with n between 3 and 9) for the stretching of respective color spaces.

Depending on the existence of memory colors, more complex printing heads can also be used on their own with 4, 6 or 8 print colors depending on the colors to be reproduced.

In order to provide even more different colors and color graduations, a diluent is preferably used in one or more printing heads.

According to a further aspect of the present invention, processes are provided for the realization of an ink jet image producing device for the printout of image data of photographic images with a printing head for more than 3 base colors or ink jet print colors. Also, it must be recognized that computer, which are used for more general purposes, can be programmed accordingly for carrying out the computer or data structure related tasks of one or more of the subunits of the device of the invention. Such a computer preferably includes a processing device for calculating the location or color coordinates of color values of image data in a color space, and preferably fulfills the functions of the determination device, the threshold device, the evaluation device, the image data analysis device, and so on, so that a conventional computer with a correspondingly equipped, possibly also conventional ink jet printer can be equipped according to the present invention and can preferably be used to provide the advantages of the invention at least to a large degree.

According to the invention it is a preferred aspect of the process that the properties of the printing medium to be printed be known, so that a threshold value or several threshold values can be selected for the determination whether a printing medium used needs to be covered with a high or low degree of coverage of an ink volume. The threshold for a color which requires a low color density is thereby selected so that as large a surface as possible of the printing medium is covered, while when a color tone with high color density is to be produced, the amount of ink to be applied is kept as small as possible. This saves ink on the one hand and allows for an increase in printing speed on the other hand by reduction of the amount of ink applied, since the shorter application and drying times contribute to an acceleration of the print production.

According to a second preferred process according to the invention, the image, data are directly searched for memory colors or image patterns, such as patterns, in order to qualify certain image regions for the reproduction with a color set or ink which is closest to a memory color or directly corresponds therewith.

It will be apparent to the person skilled in the art on study of the present disclosure, that this invention can also be used to more advantageously carry out color applications in other printing techniques or reproduction techniques. For example, one can correspondingly proceed for offset printing even when rotation offset printing machines are used. A corresponding software by which computer outputs or image reproductions on screens can be revalorized is also part of the invention. Accordingly, the attached claims are intended to cover these objects.

All combinations of image or color processing disclosed herein can be applied at different locations in the same image depending on the image content. That means the above or below disclosed processes can be used in combination, for example, for images including regions with colors of different threshold values on the one hand and regions with memory colors on the other hand.

BRIEF DESCRIPTION OF THE DRAWINGS

The invention will be further described in the following by way of example only and with reference to preferred embodiments. Further features, goals and advantages of the present invention are thereby disclosed. Reference is made to the attached drawings, wherein.

DETAILED DESCRIPTION OF THE INVENTION

Figure 1:
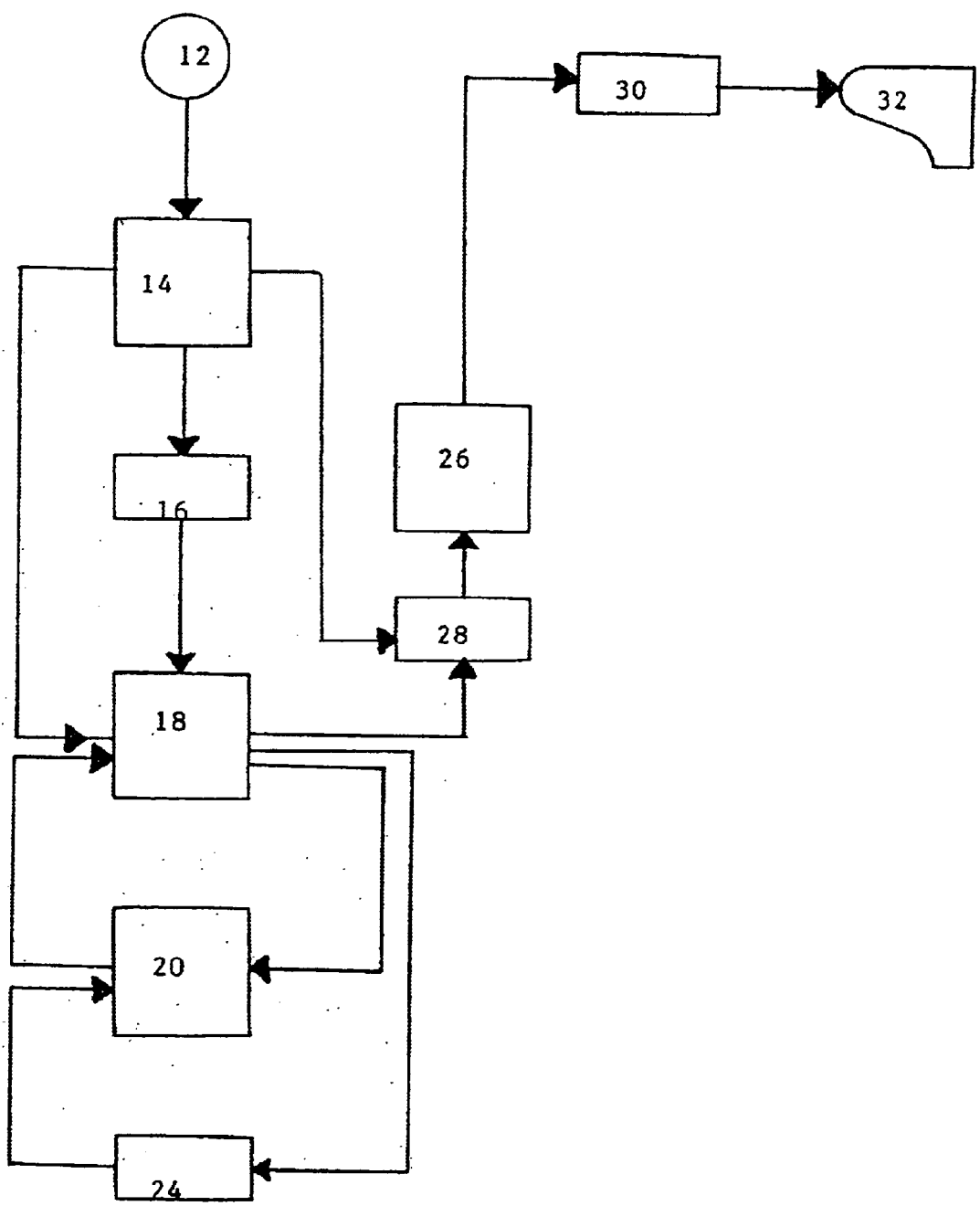
FIG. 1 is a block diagram of a first preferred embodiment according to one object of the present invention.

FIG. 1 shows the principal details of a first preferred embodiment with features according to the invention which is associated with the first object of the invention.

Position 12 defines an input interface through which image data are supplied to the device according to FIG. 1 which in the end after processing are printed out by way of a printing head with more than 3 base colors or ink jet print colors 32.

Position 12 represents different possibilities, namely, for example a scanner portion which obtains the image data by scanning a negative film, slide positives, or other conventional image data sources. It is also possible to provide here a reader station for digital memories of digital cameras or a data link to the internet through which the image data to be printed can be correspondingly received.

The image data are transferred from position 12 to an image data memory 14 for storage of the image data for further processing or recall.

A processing device 16 includes information on the base colors or inkjet print colors which are available to the printing head for printing. On the basis of this information on the base colors or the ink jet print colors, the processing device calculates a color space and determines the location or color coordinates of color values of the image data in the color space. A determination device 18 is provided for the calculation with which base or ink jet print colors, mixtures thereof, or especially also with which color densities thereof, the color values of the image data can be reproduced. More than one possible reproduction type respectively results for an ink jet printing head with more than 30 base or ink jet print colors, which means several possible color sets are respectively possible which are determined by the determination device. For example, with an ink jet printing head with four base colors such as Cyan, Magenta, Yellow and Green, it is possible to reproduce Green objects directly with the, green color or also by way of a mixture of Cyan and Yellow. Furthermore, the Green could be mixed with a small amount of Yellow and/or Cyan, the Green and/or the mixture of Cyan and Yellow can be diluted with thinners and the like. This means that generally a corresponding determination device according to the invention will respectively determine more than one color set with which the desired color can be printed.

A threshold device 20 includes data on the different essential properties of the printing medium, for example, a high-gloss paper, a normal paper or other paper types, which data are important for the printing of color photographs by way of an ink jet printer. This includes, for example, the amount of ink which a printing medium can absorb within a set amount of time and on any selected surface. The printing medium can also absorb different colors or ink products at different speeds and in different amounts. All these values can be used, if desired, in order to set one or possibly several threshold values for a most economical use.

The choice of the threshold values can, for example, also be made dependent on whether a highest possible surface coverage of the paper is to be achieved or whether as little ink as possible is to be used, either for cost reasons or because of limited absorption capacity of the paper.

Several thresholds may have to be defined per printing medium. One threshold could thereby be the maximum ink absorption capacity and the other threshold could then enable a certain printing speed.

An evaluation device 24 then determines whether a specific identified color set requires a larger or smaller amount of ink. Of course this determination process is carried out for each of the different possibly usable color sets. The threshold device then selects one of the color sets depending on the threshold for the specific printing medium used and the printing is then carried out with the selected color set and by way of the printing head control device 30. A specific color set can thereby be determined and used for each color. Subsequently, image data are recalled from memory 14 for the use of the color sets and especially at least one color set, determined from these image data. Control data are produced in this manner which are kept in an image data printing head control data memory 26 for recall by the printing head control device 30.

By way of the process carried out by this device, relatively faint colors, for example, which have a low color density can be printed out by way of a color set which enables a large surface coverage for the printing medium so that faint colors or light colors still appear natural and a rastered surface impression is avoided. Conversely, bleeding can be avoided for color tones with high color density in that the applied amount of ink is kept as small as possible, since the absorption capacity of the printing medium is generally limited.

Principally, the color sets producible by a certain selection of base colors of an ink jet printer can of course be stored in the form of tables and a selection of a suited color set can be carried out by the determination of a color tone to be reproduced and its relative location in the color space or relative to the table values and relative to one or more printing medium specific threshold values. However, since computing capacity can more and more easily and economically be made available, a suitable color set can be individually calculated for the image data even of individual image regions with individual colors.

It must be noted that it is apparent to the person skilled in the art that the units shown in FIG. 1 can be overall realized in terms of software through a processor which is used for the control of a possibly even conventional ink jet printer.

According to the invention, the information for printing can be obtained from the image data, for example, depending on the color set. That means, it can be determined which color droplets of what color at which size are to be applied to the paper for the reproduction of the image data. For example, if an ink jet printer has the colors CMYK, light C, light M, Green, Orange, medium K and light K in its color set, K, medium K and light K can be selected according to the invention for a black and white image. In contrast, C, M, Y, light C and light M are selected for a landscape picture.

Figure 2:
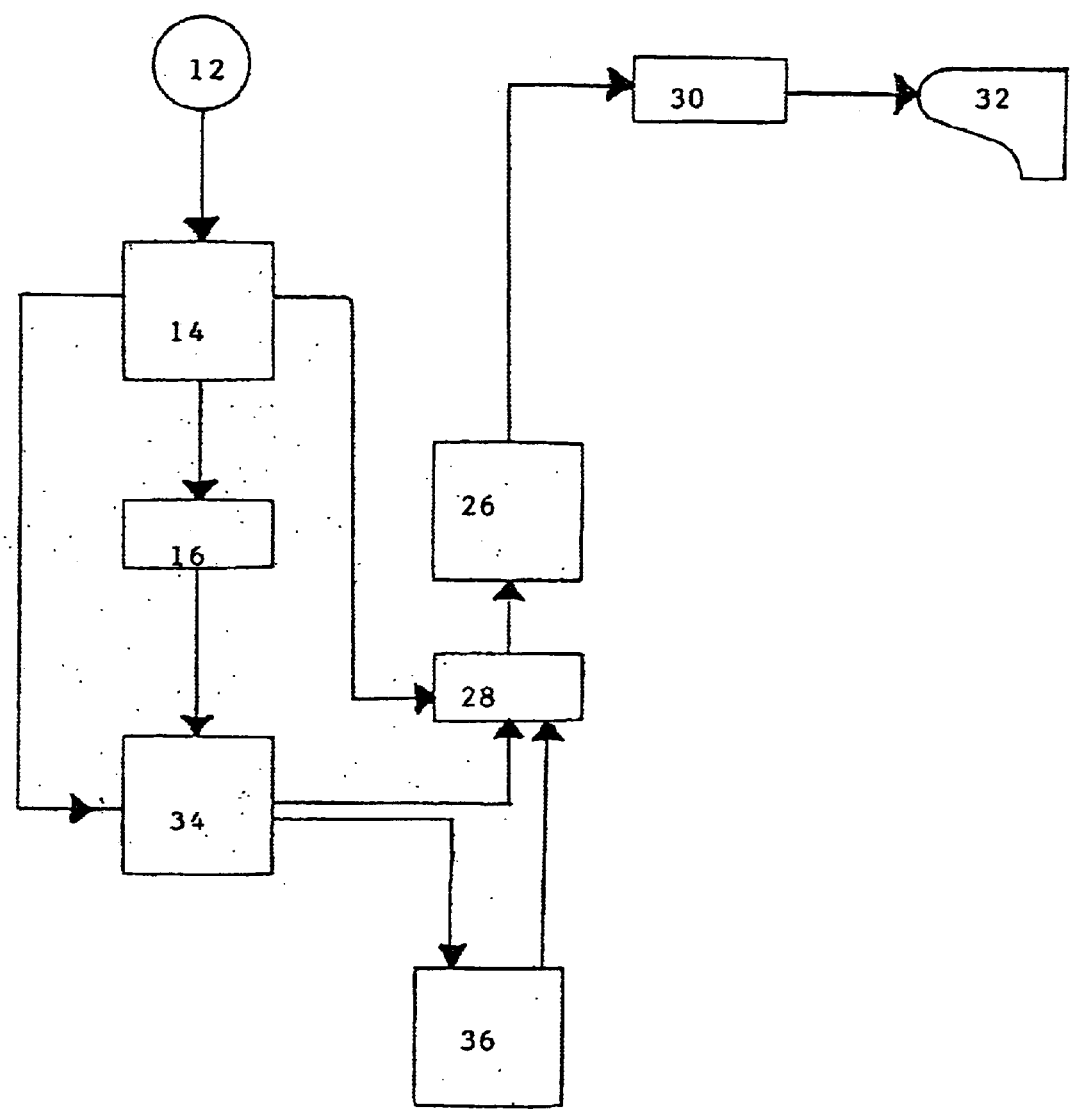
FIG. 2 is a block diagram of an embodiment according to a further object of the present invention.

The embodiment according to FIG. 2 includes portions which essentially operate the same as the correspondingly labeled portions in FIG. 1. Consequently, only differing portions and their functions are discussed below.

Accordingly, an image data analysis device 34 is provided through which image data from the image data memory 14 are searched for the presence of certain colors, so called key memory colors or memory colors. Various processes are known to the person skilled in the art for the determination of such memory colors which can all be fallen back on. Accordingly, it is therefore not necessary to explicitly discuss one or more of these processes.

After determination by the image data analysis device 34 which image data are likely best reproduced by preselected color sets or directly by suitable inks which are closest to the memory colors or even correspond therewith, the corresponding information is transmitted to a memory color assignment device 36, which assigns such color sets or directly suited inks to the applicable image data. Other image data to which no memory color can be assigned, are directly transferred to a transformation device 28. The transformation device 28 correspondingly uses control data from the image data analysis device 34 and the memory color assignment device 36 in order to correspondingly modify according to those data, the image data from the image data memory 14 and to transfer them to an image data printing head control data memory 26. These control data are recalled from there by the printing head control device and the printing head 32 is operated according to these control data.

It is easily apparent that the two advantageous embodiments according to FIGS. 1 and 2 can also be combined with one another in order to process according to FIG. 1 certain image data which are determined not to be memory color carriers before they are printed out through a printing head, while other image data which can be assigned to memory colors are processed according to FIG. 2.

When it is determined as an end result of the analysis of the image data that especially large amounts of ink are required in order to print out the desired colors, this is preferably used as a decision aspect to supply a printing medium especially suited for large amounts of ink, which could be used in place of a conventional printing medium.

Accordingly, an ink jet image producing device with various printing heads can be used in accordance with the invention, whereby one or more printing heads are specialized for certain tasks and whereby even after analysis of image data, a decision can be taken which printing medium is to be used for certain images. An optimization of the printing result on the one hand and the overall cost on the other hand can also be achieved thereby.

At the edge of the color space, where only one possibility for a natural reproduction of the color exists, one can proceed as follows according to the invention:

(a) A combination of colors is used which includes this point in the color space.

(b) A combination of colors is used which are considered suitable according to other criteria. Only for points which could not otherwise be reproduced, ink combinations are then used which enable this reproduction.

(c) A combination of colors is used which were found suitable according to certain criteria. Colors which are outside the color space reproducible with this color combination are accordingly reproduced in this color space by way of color management.

Figure 3:
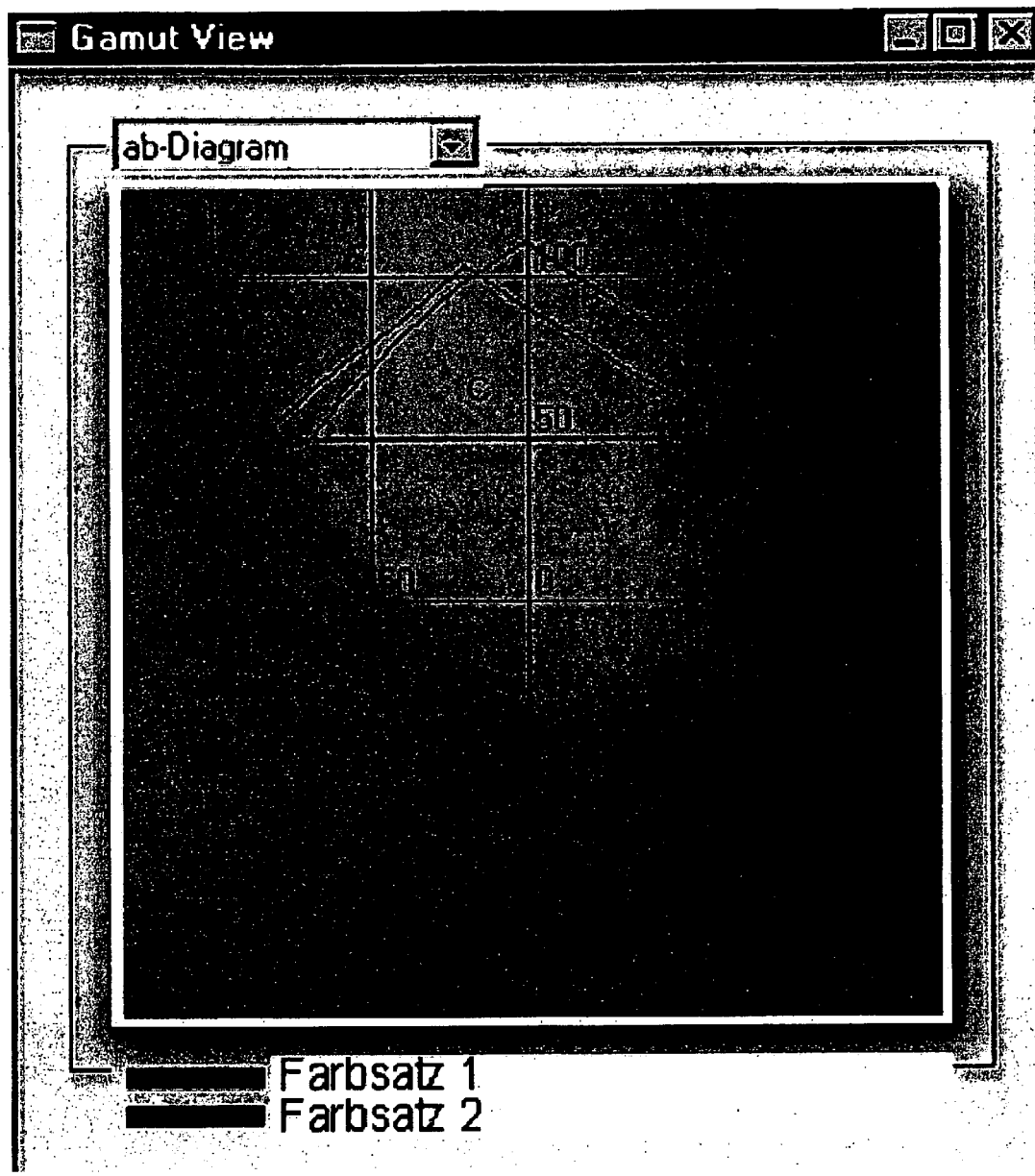
FIG. 3 is an exemplary representation of a color space.

FIG. 3 is based on the lab-color space principally known to a person skilled in the art. A projection in the ab-plane is apparent. The L-axis which represents the brightness of the color tone is perpendicular to the paper plane. The printout is in color for improved illustration. Two color spaces are shown which are defined by three base colors Cyan, Magenta and Yellow. The location of the mixed colors Green, Blue and Red, which can respectively be illustrated by two base colors are also indicated.

The following can be learned from this example:

(i) If it is found during image analysis that colors in the region of A must be reproduced in a preferred manner, a color set 1 is to be used. In the case of colors in the region B, a color set 2 is to be preferred. In the case of C, both color sets are approximately equivalent.

(ii) If the color set 1 was supplemented by a further color—in FIG. 3 the color Blue—which is located at point D, the situation would arise that colors in the region of D can be produced with relatively little ink, since one need not mix Cyan and Magenta and thereby need not increase the volume of ink to be applied.

What is claimed is:

1. Ink jet image producing device for the reproduction of digital image data of photographic images, comprising:

at least one printing head selected from the group of a printing head and a printing head arrangement, with more than three colors selected from the group of base colors and ink jet colors, which colors stretch a color space;

a computing device for calculating at least one of the location and color coordinates of color values of image data in the color space;

a determining device for determining with which colors or color mixtures, and at which color densities, altogether referred to as color set, the color data of the image data can be reproduced;

a threshold device including at least one threshold for a degree of coverage of at least one printing medium;

an evaluation device for evaluating whether a determined color set requires a larger or smaller ink amount;

the threshold device being constructed for selecting one of the color sets depending on the threshold for the printing medium used; and a print head control device for printing the image data by way of a printing head and with the selected color set.

2. Ink jet image producing device according to claim 1, further comprising an image data analysis device for determining whether image data include memory colors, and a memory color assigning device for assigning those color image data which were determined by the image data analysis device and fit memory colors, to a color set or an ink of the device which comes closest to the memory color, whereby the at least one printing head is controlled by the printing head control device during the printing of the image data and with the use of the assignment result of the memory color assignment device.

3. Ink jet image producing device according to claim 1, further comprising a transformation device for converting the image data using the selected color set into print head control data which are provided to the print head control device.

4. Ink jet image producing device according to claim 1, wherein the device includes a plurality of print heads the respective base colors or ink jet colors respectively stretch color spaces, or a print head with a plurality of base colors or ink jet colors, whereby at least two subgroups of base colors or ink jet colors can be arranged with the plurality in order to stretch at least two color spaces, whereby that print head or color set is selected the color set or ink of which best corresponds to the desired result.

5. Ink jet image producing device according to claim 1, wherein at least one print head is constructed for applying a color diluent for expanding the color space.

6. Ink jet image producing device according to claim 1, wherein at least one print head is constructed for applying a color diluent for expanding the color space.

7. Ink jet image producing device for the reproduction of digital image data of photographic images, comprising:

at least one printing head with more than three colors selected from the group of base colors and ink jet colors which stretch a color space;

a computing device for calculating at least one of the location and color coordinates of color values of image data in the color space;

an image data analysis device for determining whether the image data include a memory color;

a memory color assignment device for assigning the color image data which were determined by the image data analysis device and which fit memory colors, to a color set or an ink of the device which comes closest to the memory color; and a printing head control device for controlling the at least one printing head during the printing of the image data, using the assignment result of the memory color assignment device.

8. Ink jet image producing device according to claim 6, further comprising:

a determining device for determining with which colors or mixtures, and at which color densities thereof, altogether referred to as color set, the color data of the image data can be reproduced;

a threshold device including at least one threshold for a degree of coverage of at least one printing medium;

an evaluation device for evaluating whether a determined color set requires a larger or smaller ink amount, whereby the threshold device selects one of the color sets depending on the threshold for the printing medium used; and a print head control device for printing the image data by way of a printing head and with the selected color set.

9. Ink jet image producing device according to claim 7, further comprising a transformation device for converting the image data using the selected color set into print head control data which are provided to the print head control device.

10. Ink jet image producing device according to claim 7, wherein the device includes a plurality of print heads the respective colors of which respectively stretch color spaces, whereby that print head is selected the color set or ink of which best corresponds to the desired result.

11. Process for the control of an ink jet image producing device for the printing of image data of a photographic image with a print head for more than three colors selected from the group of base colors and ink jet printing colors, comprising the steps of:

calculating a color space on the basis of the colors of the at least one print head and calculating the location or color coordinates of color values of the image data;

determining a color set including the colors or mixtures and densities thereof, with which color set the image data can be reproduced;

loading a threshold for a degree of coverage of at least one print medium into a threshold device;

determining if a determined color set requires a large or small amount of ink for the printing of a color to be reproduced;

selecting a color set depending on the threshold for the printing medium; and extracting from the image data, depending on the color set determined, information for the printing for printing the image data with the most fitting appearance.

12. Process according to claim 11, comprising the further steps of:

producing a color space on the basis of the base or ink jet colors available to the printing head by calculating a location or color coordinates of color values of image data in the color space;

analyzing the image data which correspond to key memory data for determining whether the image data include memory colors;

assigning a color set or an ink of a color set to the color image data determined by the image data analysis device which image data fit memory colors, which color set or ink of a color set comes closest to or corresponds with the memory color; and modifying the image data using the assignment result and printing the modified image data with a printing head.

13. Process for the control of an ink jet image producing device for the printing of image data of photographic images, with a printing head for more than three basic colors or ink jet colors, comprising the steps of:

producing a color space on the basis of the base or ink jet printing colors available to the printing head, whereby a location or color coordinates of color values of image data in the color space are calculated;

analyzing the image data for determining whether the image data include memory colors;

assigning a color set or an ink of a color set to the color image data determined by the image data analysis device which image data fit to memory colors, which color set or ink comes closest to or corresponds with the memory color; and modifying the image data using the assignment result and printing the modified image data with a printing head.

* * * * *